US006687999B2

(12) United States Patent
Harman et al.
(10) Patent No.: US 6,687,999 B2
(45) Date of Patent: Feb. 10, 2004

(54) METHOD FOR MANUFACTURING INK DISPENSING ROLLER

(75) Inventors: Anthony David Harman, Barkway (GB); Hugh Williams, Cambridge (GB)

(73) Assignee: Neopost Limited, Romford (GB)

(*) Notice: Subject to any disclaimer, the term of this patent is extended or adjusted under 35 U.S.C. 154(b) by 0 days.

(21) Appl. No.: 10/151,115

(22) Filed: May 21, 2002

(65) Prior Publication Data

US 2002/0137614 A1 Sep. 26, 2002

Related U.S. Application Data

(62) Division of application No. 09/635,243, filed on Aug. 9, 2000, now Pat. No. 6,389,967.

(30) Foreign Application Priority Data

Aug. 10, 1999 (GB) ............................................ 9918881

(51) Int. Cl.[7] ................................................ B23P 15/00

(52) U.S. Cl. ...................... 29/895.21; 29/895.3; 492/48

(58) Field of Search ............................. 492/48, 57, 28; 29/895.2, 895.22, 895.23, 428, 895.3, 458

(56) References Cited

U.S. PATENT DOCUMENTS 2,913,980 A 11/1959 Lindemann
3,158,095 A 11/1964 West et al.
3,253,542 A 5/1966 McDonough
3,436,161 A 4/1969 Charos
3,491,685 A 1/1970 Tramposch
3,812,782 A 5/1974 Funahashi
3,971,315 A 7/1976 Hansen
4,024,816 A 5/1977 Williams
4,069,758 A 1/1978 Docteur
5,136,968 A 8/1992 Sarada et al.
5,189,954 A 3/1993 Ono
5,351,615 A * 10/1994 Kobler et al. ............... 101/217
5,379,693 A * 1/1995 Hoffmann et al. .......... 101/375
5,488,903 A * 2/1996 Kobler et al. ............... 101/375
5,752,444 A * 5/1998 Lorig ......................... 101/375
5,784,961 A * 7/1998 Lorig et al. ................. 101/375
5,987,748 A * 11/1999 Calloway ................. 29/895.21
6,104,896 A * 8/2000 Zaman et al. ............... 399/117
6,119,343 A * 9/2000 Nishida et al. ............ 29/895.2
6,234,078 B1 5/2001 Kessler
6,386,103 B1 * 5/2002 Charette et al. ............ 101/375
6,484,402 B2 * 11/2002 Glockner et al. ........ 29/895.21

* cited by examiner

*Primary Examiner*—Irene Cuda-Rosenbaum
(74) *Attorney, Agent, or Firm*—Shoemaker and Mattare

(57) ABSTRACT

A construction of ink dispensing roller is described in which a porous ink metering layer extends around a peripheral surface of a porous ink reservoir. To prevent relative movement between the ink metering layer and the ink reservoir, the ink metering layer is securely located relative to the ink reservoir by means of elements of the ink metering layer extending beyond each axial end of the ink reservoir and being clamped between end cheeks and the axial end walls of the ink reservoir. The ink metering layer is manufactured from sheet material joined by welding along opposite edges into a tubular form. After welding the tubular form is manipulated so that an inner surface becomes a radially exterior ink dispensing surface.

5 Claims, 2 Drawing Sheets

METHOD FOR MANUFACTURING INK DISPENSING ROLLER

This application is a divisional of U.S. application Ser. No. 09/635,243, filed Aug. 9, 2000, now U.S. Pat. No. 6,389,967.

BACKGROUND OF THE INVENTION

This invention relates to ink dispensers and in particular to ink dispensers in the form of a roller of porous material holding ink within the pores of the material.

Ink dispensers in the form of rollers are used to apply ink to impression faces of type fonts of a printing device for example a drum printer used in postage meters. The drum printer used in a postage meter comprises a rotatable print drum carrying a die plate extending around the peripheral surface of the drum for printing invariable information and a plurality of type wheels, extending through one or more apertures in the die plate, carrying type characters for printing variable data. During printing, the rotatable drum is rotated with the surface of the ink dispensing roller pressed against the impression faces of the die and type characters thereby to apply a layer of ink to the impression faces. After receiving the ink, rotation of the drum brings, the inked impression faces into printing engagement with a print receiving surface of a mail item to produce a printed impression on the mail piece.

The ink dispensing roller includes an ink reservoir comprising porous material of cylindrical shape. Initially pores of the material are charged with ink. Rotation of the ink dispensing roller while in engagement with the print drum causes ink to be dispensed from the peripheral surface of the porous material. The ink removed from the peripheral surface of the porous material is replenished with ink drawn from the inner part of the porous material. When the quantity of ink removed from the reservoir results in depletion of ink to an amount which is incapable of fully inking the impression faces of the print drum, the ink dispensing roller is replaced with a fully charged ink dispensing roller. It is advantageous for the ink dispensing roller to contain a sufficient quantity of ink that the ink dispensing roller is capable of use in a relatively large number of printing operations and only requires to be replaced infrequently. In order to permit a sufficiently large amount of ink to be contained in the ink dispensing roller the pores or voids occupy as large a percentage of the reservoir as is practicable. However, while large voids enable a relatively large quantity of ink to be contained in the reservoir, the large voids result in relatively low surface tension effects acting on the ink in the reservoir. Consequently initially ink is released too readily from the large voids so that there is a tendency for too much ink to be applied to the impression faces of the print drum. Also due to the low surface tension effects, when ink is removed from the surface of the ink dispensing roller the surface tension acting on the ink in the pores is insufficient to ensure withdrawal of ink from the inner portions of the ink reservoir so that a significant quantity of ink remains within-the reservoir when the ink becomes depleted at the surface of the ink dispensing roller.

To overcome the deficiencies of ink dispensing rollers described hereinbefore and to provide an ink dispensing roller having a substantially uniform and constant rate of dispensing of ink, known ink dispensing rollers have been provided with a layer of material extending over the ink supplying surface of the ink reservoir, the layer of material having pores which are of smaller dimension than the pores of the porous material forming the ink reservoir. The layer of material having relatively small pores acts to meter the supply of ink from the ink reservoir to the external peripheral surface of the ink dispensing roller. Also the smaller pores result in an increased surface tension effect acting on the ink thereby ensuring that an increased quantity of ink is drawn from the pores of the reservoir during use of the ink dispensing roller. With the metering of the ink and improvement of withdrawal of ink from the reservoir, due to the provision of the layer with relatively small pores, ink dispensing rollers can achieve a relatively high number of printing operations before replacement of the ink dispensing roller is required.

In known constructions of ink dispensing device in which an outer layer of material having relatively small pores extends over an outer surface of an ink reservoir having relatively large pores, the layer of material is bonded to the outer surface of the ink reservoir by means of an intermediate layer of adhesive. It will be appreciated that the intermediate layer of adhesive must permit the flow of ink therethrough from the ink reservoir to the outer layer of the ink dispensing device and furthermore the adhesive must be compatible with the ink.

The present invention overcomes the disadvantages of bonding the outer layer to the ink reservoir by means of adhesive.

SUMMARY OF THE INVENTION

According to a first aspect of the present invention an ink dispensing roller includes a cylindrical ink reservoir having a peripheral surface, said ink reservoir comprising porous material having a relatively high void content for containing ink; an outer metering layer extending in ink transfer engagement with the peripheral surface of the ink reservoir, said outer metering layer comprising material having relatively small pores and said outer metering layer being effective to dispense ink from an outer ink dispensing surface thereof and to draw ink from said ink reservoir to replenish ink dispensed from the ink dispensing surface; said outer metering layer being provided with elements extending beyond the peripheral surface of the cylindrical ink reservoir adjacent respective end walls of the ink reservoir; and means cooperating with the ink reservoir to secure and maintain said elements located adjacent said respective end walls of the cylindrical ink reservoir.

Preferably the means to secure the elements of the outer metering layer include end cheeks, and the elements of the outer metering layer are clamped between the end cheeks and the ink reservoir.

According to a second aspect of the present invention in a method of manufacturing an ink dispensing roller comprising a cylindrical ink reservoir having a peripheral surface and an outer metering layer of tubular form extending around said peripheral surface of the ink reservoir, the method includes the steps of providing a sheet of porous material having first and second opposite faces and first and second edges extending in spaced parallel relationship respectively along opposite edges of said sheet; said first and second edges intersecting with said first face along first and second lines respectively; bringing first and second areas of the first face of the sheet adjacent said first and second lines respectively into face to face contact with the first and second lines aligned with one another; effecting welding to join the sheet along said first and second lines and thereby form the sheet into a metering layer of tubular form and locating the metering layer of tubular form to extend around and in ink transfer engagement with the peripheral surface of the ink reservoir.

Preferably after the welding step the tubular form is manipulated so that the face becomes a radially exterior surface of the metering layer of tubular form.

If desired, welding is effected along a relatively narrow region of the first and second edges and after said welding additional material is welded to the first and second edges to form a reinforcing bead extending between the first and second edges.

BRIEF DESCRIPTION OF THE DRAWINGS

An embodiment of the invention will be described by way of example with reference to the drawings in which.

DESCRIPTION OF THE PREFERRED EMBODIMENT

Figure 1:
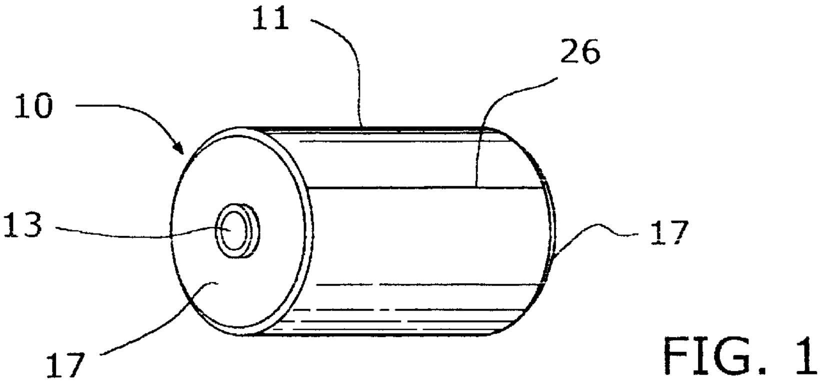
FIG. 1 illustrates a construction of ink dispensing roller in accordance with the invention.
Figure 2:
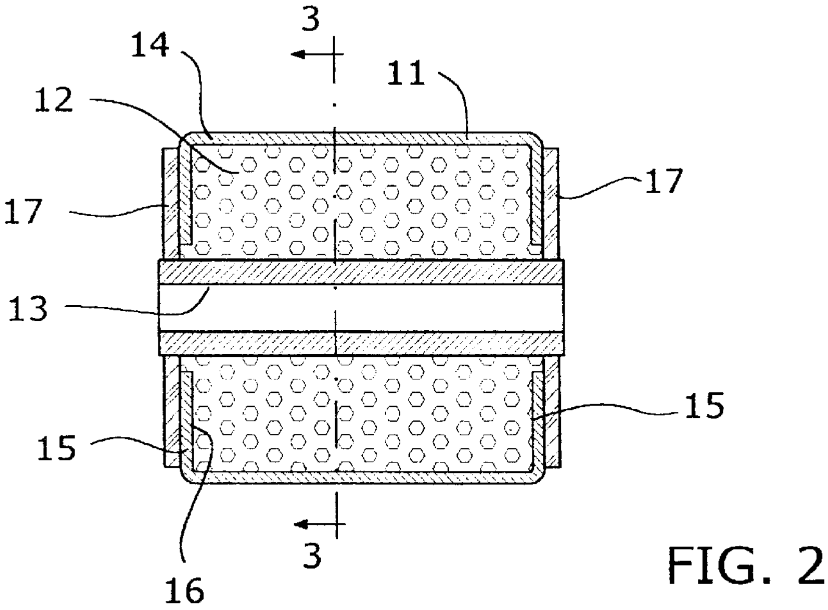
FIG. 2 is a diametrical cross section of the ink dispensing roller illustrated in FIG. 1.
Figure 3:
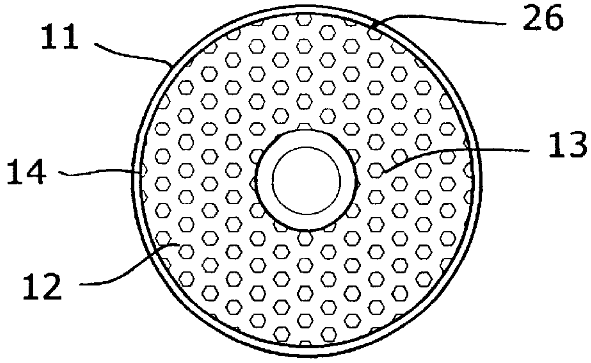
FIG. 3 is a cross section on the line 3—3 of FIG. 2.

Referring to the drawings, an ink dispensing roller comprises a cylindrical roller 10 having a peripheral ink dispensing surface 11. The ink dispensing roller is constructed of a cylindrical ink reservoir 12 mounted on a tubular support 13 and an outer ink metering layer 14 extending around the peripheral surface of the ink reservoir. The ink reservoir 12 has a relatively large percentage of voids and for example may be formed of melamine formaldehyde foam having cells or pores of 60–200$\mu$ providing 97% void volume. A suitable material from which to form the ink reservoir is marketed under the name Basotect by BASF. The Basotect material is compressed under the action of heat and pressure to 3 times its original density of approximately 9–11 Kg/m$^3$ and a blank to form the ink reservoir is cut from the compressed material. The outer metering layer 14 has relatively small pores and is formed of porous elastomer having cells or pores for example of 10–40$\mu$ providing approximately 60% void volume. A suitable porous elastomer from which to form the outer metering layer is Permair F (Porvair). The layer of elastomer initially has a surface skin on both inner and outer faces. Prior to assembly of the outer metering layer to the ink reservoir, the surface skin on the inner face of the material is removed. This removal of the surface skin may be effected by an abrasion process.

The elastomer of which the outer metering layer 14 is manufactured is available in sheet form and hence the tubular outer metering layer is formed by welding the sheet together along lines in which a pair of opposite edges of a rectangle of the material intersect respectively with a face of the material. In the assembled ink dispensing roller, the line of welding extends along the length of the roller and is indicated by reference 18.

Figure 4:
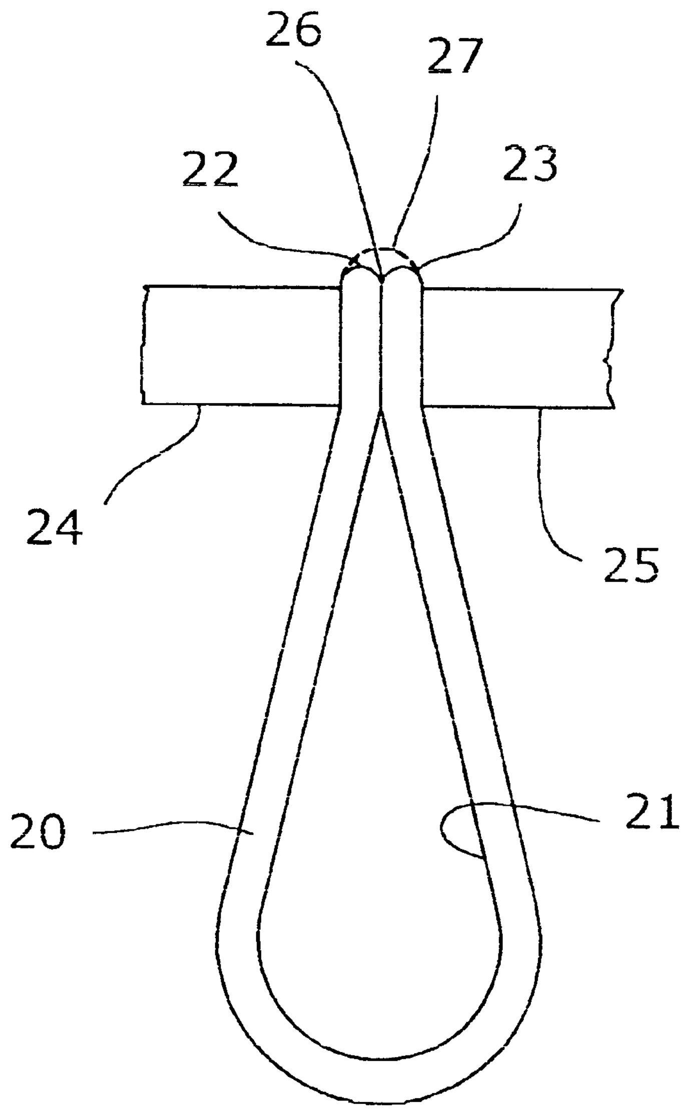
FIG. 4 illustrates a method of manufacturing a tubular outer ink metering layer of the ink dispensing roller.

The welding of the edges of the sheet to form the ink metering layer is conveniently effected as illustrated in FIG. 4 in which the sheet is operated upon to bring lines of the sheet that are to be to joined into alignment. A rectangle of material 20 having a surface 21 is manipulated to bring areas of the surface adjacent opposite spaced parallel edges 22, 23 into face to face engagement and the edges 22, 23 into alignment with one another. Clamp elements 24, 25 are utilised to maintain the aforesaid areas of the surface 21 in engagement and the edges 22 and 23 in alignment. The manipulated sheet is located between the clamp elements 24, 25 with the edges 22, 23 projecting proud of the clamp elements by approximately 0.5 mm. Conveniently, this may be effected by locating the sheet to project by an amount in excess of 0.5 mm and then trimming the projecting parts of the sheet to obtain edges 22, 23 projecting by the required 0.5 mm projection. A weld joint is formed in a region 26 between the edges 22, 23. Preferably the weld joint is formed by directing a jet of air heated to approximately 400° C. to the region 26 to be welded. If a relatively rapid pass of the jet of heated air is made along the projecting edges 22, 23, the region 26 in which the elastomeric material is fused to form the weld is relatively narrow and does not extend across the entire thickness of the sheet 20. The transverse extent of the region 26 in which the elastomeric material is fused may be controlled by the rate of passage of the jet of heated air along the length of the region 26 and by the amount of compression of the elastomeric material due to pressure exerted the clamp elements 24, 25. If desired, after welding the edges as hereinbefore described, additional elastomeric material may be located adjacent the edges 22, 23 and melted by the jet of heated air to form a reinforcing bead 27 welded to and bridging between the edges 22, 23 to thereby reinforce the initial weld joint. Alternatively, if desired, a less rapid pass of the jet of heated air along the edges 22, 23 may be made and this results in formation of a bead 27 extending laterally across a substantial area of the edges 22, 23 thereby eliminating any need to form separately a bead bridging e between the edges 22, 23.

In order that ink is dispensed uniformly to the entire impression face of a print die it is desired that the external surface of the outer metering layer is substantially uniformly porous. The welding of the edges of the sheet of elastomer results in formation of a fused bead 27 of the elastomer along the welded joint. The fused bead is not porous and hence would not permit ink to be dispensed from the roller in the region of the bead. Therefore after welding, the tube formed by the welding is turned inside out so that the surface 21 becomes the radially exterior surface and the fused bead is located on the interior surface of the tubular metering layer. In the welding of the edges of the sheet as described hereinbefore with reference to FIG. 4, fusing of the elastomeric material located at the surface 21 of the sheet in the welding process is restricted and as a result the surface 21 forming the radially exterior surface of the tubular metering layer presents a substantially uniformly porous surface for dispensing of ink.

The ink reservoir 12 may have a radial dimension of approximately 30 mm and the outer metering layer 14 may be 0.5–1.00 mm thick. The outer metering layer is in the form of a cylindrical tube and has a natural unextended internal diameter less than the external diameter of the ink reservoir. Accordingly when the cylindrical tube forming the metering layer 14 is located to extend around the ink reservoir, the cylindrical tube is subjected to stretching and thereby the layer 14 is disposed in engagement with and in ink transfer relationship with the peripheral surface of the ink reservoir. Typically location of the outer metering layer on the ink reservoir results in the outer metering layer being stretched by 10–20%. Due to the elastomeric characteristic of the material forming the metering layer 14, the stretch of the material is maintained over a time period. The outside diameter of the ink dispensing roller is determined by tension in the metering layer 14 being reacted to by radial compression of the foam material forming the ink reservoir 12. This pre-tensioning of the outer metering layer inhibits ruckling of the layer along the circumference of the roller when in engagement with a driven print drum.

In use, the ink dispensing roller is pressed toward impression faces of printing dies and the like with the ink dispensing surface 11 of the metering layer 14 in ink dispensing engagement with the impression faces. Due to the pressing of the ink dispensing surface into engagement with the impression faces of printing dies and the like, the material of the outer metering layer 14 and of the ink reservoir 12 is subjected to mechanical pressure in the region of engagement of the ink dispensing surface 11 with the impression faces and, as a result, mechanical distortion of the layer 14 and of the ink reservoir occurs. The materials of which the ink reservoir 12 and the metering layer 14 are formed are selected to avoid creep in the pretension of the ink reservoir and the outer metering layer against one another during storage that would cause change in dimension of the ink roller. The materials are also selected such that neither material is subject to excessive creep under the load of mechanical pressure during engagement of the ink dispensing roller with the printing dies which would cause the outside diameter of the ink dispensing roller to change with time. This mechanical distortion due to the mechanical pressure may result in movement of the metering layer 14 relative to the surface of the ink reservoir and as a consequence the metering layer 14 may move in an axial direction relative to the ink reservoir and cause an area of the ink reservoir surface to be exposed. In the event of such axial movement occurring, any part of the ink reservoir peripheral surface that becomes exposed would not operate with the benefits accorded by the provision of the metering layer. Accordingly means are provided to prevent relative movement of the metering layer relative to the peripheral surface of the ink reservoir and thereby to maintain the metering layer located in a required position relative to the ink reservoir.

The cylindrical tube forming the outer metering layer 14 has end elements 15 extending from the layer 14 at each end thereof. It will be appreciated that the material forming the outer layer 14 and the elements 15 is elastomeric so that the elements 15 are capable of extending radially inwards toward the tubular support 13 adjacent end walls 16 of the ink reservoir 12. Circular end cheeks 17 are secured to the tubular support 13 so as to clamp the elements 15 between the cheeks 17 and the end walls 16 of the ink reservoir. The clamping of the elements 15 between the cheeks and the end walls of the ink reservoir ensures that the outer metering layer 14 extending around the peripheral surface of the ink reservoir is maintained in ink transfer relationship with the peripheral surface of the ink reservoir without relative movement between the portion 14 and the ink reservoir 12. If desired in order to improve the clamping of the elements 15 between the cheeks 17 and the end walls 16 of the ink reservoir, the end cheeks may be provided with projections in the form of bumps or spikes engaging the elements 15 of the outer metering layer.

If desired the porous material forming the ink reservoir may be of greater axial length than required for the ink dispensing roller. The cheeks 17 exert pressure in opposed axial directions on the end walls of the ink reservoir and reduce the axial length of the ink reservoir to the desired axial length.

Pressure in a radially inward direction exerted on the peripheral surface of the ink reservoir adjacent the end walls thereof by the tension in the outer ink metering layer tends to result in a reduced diameter of the ink reservoir adjacent the end walls thereof and consequently axially end portions of the ink roller are less effective in dispensing ink than the major part of the axial length of the ink dispensing roller. The provision of an ink reservoir which is longer than required and then compressing the ink reservoir to the required axial length by the end cheeks counteracts the radial compression of the ink reservoir so that the diameter of the ink dispensing roller is substantially uniform throughout the axial length thereof.

The tubular support 13 and end cheeks 17 may be formed of synthetic plastic and the end cheeks may be formed to be an interference fit on the tubular support. Alternatively or in addition the cheeks and the tubular support may be formed such that the cheeks snap into and are maintained in desired locations relative to the tubular support so as to clamp the elements 15 between the ink reservoir and the end cheeks.

It is to be understood that dimensions, percentage voids and degree of stretch of the metering layer recited hereinbefore are provided only as examples and are not to be interpreted as limiting the scope of the invention. Also the examples, of commercially available materials from which the elements of the ink dispensing roller may be formed are provided only as examples and other materials that are suitable may be used.

We claim:

1. A method of manufacturing an ink dispensing roller comprising a cylindrical ink reservoir having a peripheral surface and an outer metering layer of tubular form extending around the peripheral surface of the reservoir, the method comprising steps of:

providing a sheet of a porous material having first and second opposite faces and first and second parallel, opposite edges, the first and second edges intersecting the first face along respective ones of first and second lines;

bringing first and second areas of the first face of the sheet adjacent the first and second lines into face to face contact, with the first and second lines aligned with one another; welding the sheet along the first and second lines so as to form the sheet into a metering layer of tubular form; and locating the tubular metering layer to extend around and in ink transfer engagement with the peripheral surface of the reservoir.

2. A method as claimed in claim 1, wherein the welding step comprises a step of:

welding the first and second edges along a first narrow region, and subsequently welding additional material to the first and second edges to form a reinforcing bead between the first and second edges.

3. A method as claimed in claim 1, prior to the locating step, further comprising a step of:

manipulating the tubular metering layer to cause the first face of the sheet to be a radially exterior surface of the tubular metering layer.

4. A method as claimed in claim 3, wherein the second face of the sheet includes a surface skin, and, prior to the manipulating step, further comprising a step of:

abrading the second face of the sheet to remove the surface skin thereof.

5. A method as claimed in claim 1, wherein the welding step is performed using a jet of heated air.

* * * * *